(12) United States Patent
Seong

(10) Patent No.: US 10,957,885 B2
(45) Date of Patent: Mar. 23, 2021

(54) RECHARGEABLE BATTERY HAVING CASE

(71) Applicant: Samsung SDI Co., Ltd., Yongin-si (KR)

(72) Inventor: Jae-Il Seong, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1129 days.

(21) Appl. No.: 14/958,519

(22) Filed: Dec. 3, 2015

(65) Prior Publication Data

US 2016/0164052 A1    Jun. 9, 2016

(30) Foreign Application Priority Data

Dec. 4, 2014    (KR) .................. 10-2014-0173309

(51) Int. Cl.
*H01M 2/02*    (2006.01)
(52) U.S. Cl.
CPC ........... *H01M 2/0292* (2013.01); *H01M 2/02* (2013.01)
(58) Field of Classification Search
None
See application file for complete search history.

(56) References Cited

U.S. PATENT DOCUMENTS

| 2006/0105238 A1* | 5/2006 | Woo | ..................... H01M 2/0267 429/180 |
|---|---|---|---|
| 2012/0040239 A1 | 2/2012 | Takahashi et al. | |

FOREIGN PATENT DOCUMENTS

| JP | 56-109458 | | 8/1981 | | |
|---|---|---|---|---|---|
| JP | 56109458 A | * | 8/1981 | .......... | H01M 2/0222 |
| JP | 58-014461 | | 1/1983 | | |
| JP | 58014461 A | * | 1/1983 | .......... | H01M 2/0222 |
| JP | 60-198050 | | 10/1985 | | |
| JP | 60198050 A | * | 10/1985 | .......... | H01M 2/0235 |
| JP | 07-018346 U | | 3/1995 | | |
| JP | 2010-086781 | | 4/2010 | | |
| JP | 2011187337 A | * | 9/2011 | .......... | H01M 2/0225 |
| JP | 2012-038650 | | 2/2012 | | |
| KR | 10-2009-0095547 A | | 9/2009 | | |

OTHER PUBLICATIONS

Ikeda et al., JP 2011187337 A, machine translation.*
Office action dated Dec. 9, 2020 in corresponding Korean patent application No. 10-2014-0173309, 6 pp.

* cited by examiner

*Primary Examiner* — Haixia Zhang
(74) *Attorney, Agent, or Firm* — Knobbe, Martens, Olson & Bear, LLP

(57) ABSTRACT

A rechargeable battery that can reduce rust occurrence is provided. The rechargeable battery includes: an electrode assembly including a positive electrode and a negative electrode; a case that houses the electrode assembly; and a cap plate that is coupled to the case, wherein an angle between a front end surface that is formed at the front end of the case and an outer surface of the case is larger than an angle between the front end surface and an inner surface of the case.

15 Claims, 3 Drawing Sheets

RECHARGEABLE BATTERY HAVING CASE

RELATED APPLICATIONS

This application claims priority to and the benefit of Korean Patent Application No. 10-2014-0173309 filed in the Korean Intellectual Property Office on Dec. 4, 2014, the entire contents of which are incorporated herein by reference.

BACKGROUND

Field

The present invention relates to a rechargeable battery. More particularly, the present invention relates to a rechargeable battery having a case Description of the Related Art A rechargeable battery can be repeatedly charged and discharged, unlike a primary battery. A small capacity rechargeable battery of is used for small portable electronic devices like mobile phones or laptop computers and camcorders, and a large capacity rechargeable battery is used as a power source for driving motors of hybrid and electric vehicles.

The rechargeable battery has a case, and an electrode assembly including a positive electrode and a negative electrode is inserted into the case. The case may be produced by a drawing processing, and by cutting the drawing-processed case with a punch and a die. Further, an upper end portion of the case is processed.

When the upper end portion of the case is processed with the punch, a scratch can occur at an inner surface and an outer surface as well as an upper end surface of the case caused by the processing. When such a scratch is formed, rust may occur at the upper end portion of the case.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a rechargeable battery having advantages of being capable of reducing rust occurrence.

An exemplary embodiment of the present invention provides a rechargeable battery including: an electrode assembly including a positive electrode and a negative electrode; a case that houses the electrode assembly; and a cap plate that is coupled to the case, wherein an angle between a front end surface that is formed at the front end of the case and an outer surface of the case is larger than an angle between the front end surface and an inner surface of the case.

The angle between the front end surface and the outer surface of the case and the angle between the front end surface and the inner surface of the case may be obtuse angles, and when the angle between the front end surface and the inner surface of the case is 90+A1 and the angle between the front end surface and the outer surface of the case is 90+A2, A2 may be 1.1 times to 2.5 times A1.

A plating layer may be formed at the outer surface, and the plating layer may be formed to a corner at which the front end surface and the outer surface meet, while a plating layer may be formed at the inner surface, and the plating layer may be formed of nickel to a corner at which the front end surface and the inner surface meet.

The plating layer that is formed at the outer surface of the case and the plating layer that is formed at the inner surface of the case may be made of nickel, and a film for preventing rust from occurring may be formed at the front end surface.

The film may be an oil film, and the film may be a chromate film.

According to an exemplary embodiment of the present invention, because an angle between a front end surface of a case and an outer surface of the case is formed larger than that between the front end surface of the case and an inner surface of the case, the inner surface or the outer surface of the case is prevented from being damaged and thus rust occurrence can be reduced.

DETAILED DESCRIPTION

Figure 1:
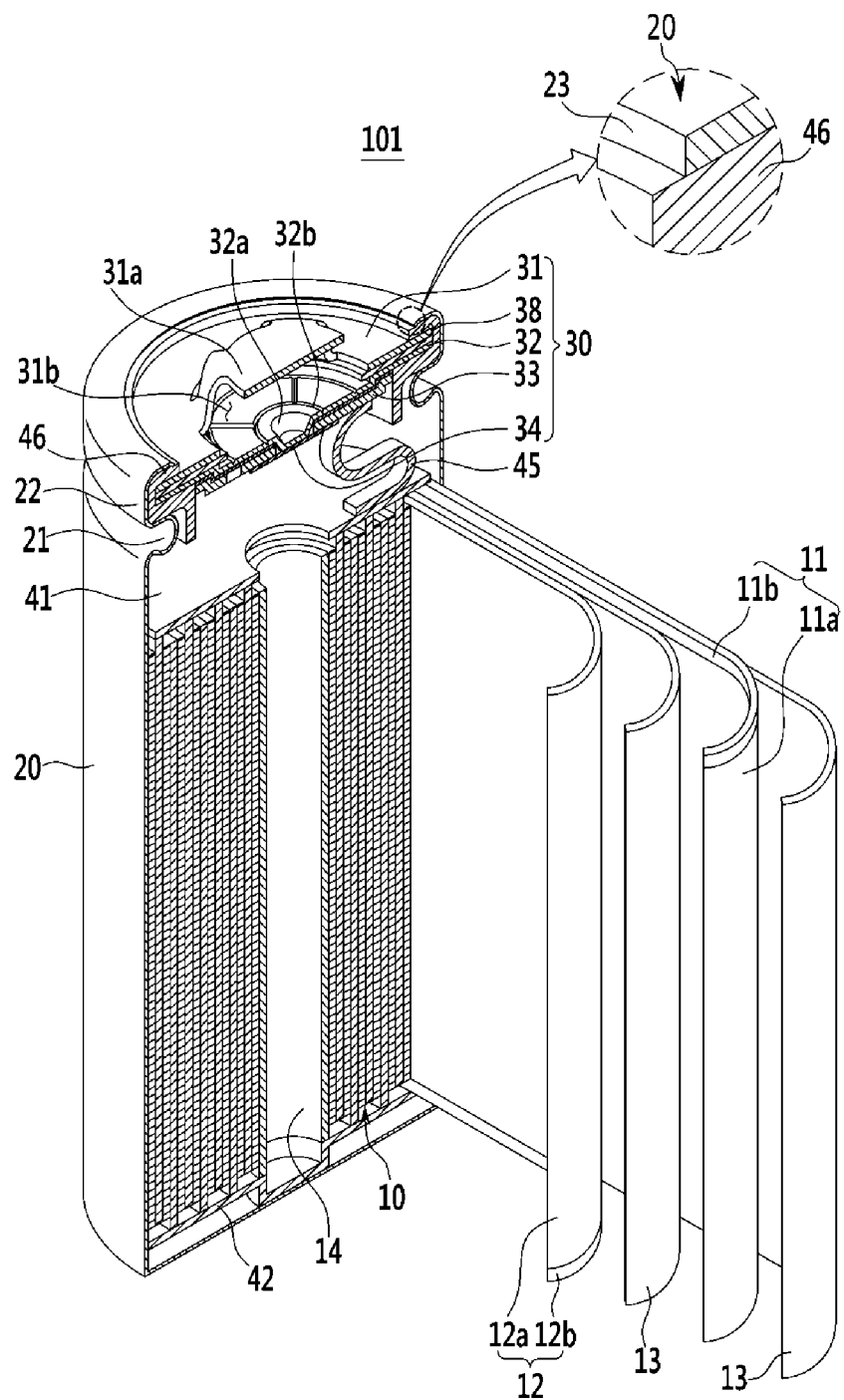
FIG. 1 is a partially cut-away perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a partially cut-away perspective view of a rechargeable battery according to a first exemplary embodiment of the present invention.

Referring to FIG. 1, a rechargeable battery 101 according to the first exemplary embodiment includes an electrode assembly 10 that generates a current, a case 20 that houses the electrode assembly 10, and a cap assembly 30 that is coupled to the case 20 to be electrically connected to the electrode assembly 10.

The electrode assembly 10 includes a positive electrode 11, a separator 13, and a negative electrode 12 that are sequentially disposed. The electrode assembly 10 is formed by spiral-winding the positive electrode 11, the negative electrode 12, and the separator 13 which is an insulator that is disposed therebetween. For example, the electrode assembly 10 is formed in a cylindrical shape. A core pin 14 is disposed at the center of the cylindrical electrode assembly 10. The core pin 14 is formed in a cylindrical shape, and supports the electrode assembly 10 so as to maintain a cylindrical shape of the electrode assembly 10.

The positive electrode 11 and the negative electrode 12 form a current collector with a metal foil of a thin plate, and include coated portions 11a and 12a at which an active material is coated and uncoated portions 11b and 12b at which an active material is not coated. A positive electrode current collecting plate 41 is connected to the uncoated portion 11b of the positive electrode 11 and is disposed at an upper end portion of the electrode assembly 10. A negative electrode current collecting plate 42 is connected to the uncoated portion 12b of the negative electrode 12 and is disposed at the lower end of the electrode assembly 10 to be attached to the bottom of the case 20 by welding.

The present exemplary embodiment illustrates a structure in which the positive electrode current collecting plate 41 is installed at an upper portion and in which the negative electrode current collecting plate 42 is installed in a lower portion, but the present invention is not limited thereto, and the positive electrode current collecting plate may be installed in a lower portion and the negative electrode current collecting plate may be installed in an upper portion.

In order to insert the electrode assembly 10, the case 20 may be formed in a cylindrical shape or a square shape in which one side is opened. The case 20 is connected to the negative electrode current collecting plate 42 to operate as a negative terminal in the rechargeable battery 101, and is made of a conductive metal such as aluminum, an aluminum alloy, or nickel plated steel.

The cap assembly 30 is inserted into the case 20 and is fixed to the case 20 through a clamping process, and in this case, a beading portion 21 and a clamping portion 22 are formed in the case 20.

The cap assembly 30 is coupled to the opening side of the case 20 by interposing a gasket 46 to close and seal the case 20 that houses the electrode assembly 10 and an electrolyte solution. The cap assembly 30 includes a cap plate 31, a vent plate 32, a middle plate 33, a sub-plate 34, and a positive temperature coefficient (PTC) element 38.

The cap plate 31 is formed in a plate shape having an outer terminal 31a and an air outlet 31b that are protruded upward. The cap plate 31 is finally electrically connected to the positive electrode current collecting plate 41 to operate as a positive electrode terminal in the rechargeable battery 101.

The positive temperature coefficient element 38 is formed in a circular ring shape, and is located between the cap plate 31 and the vent plate 32. The positive temperature coefficient element 38 is an element in which resistance increases according to an increase of temperature, and switches flow of a current between the cap plate 31 and the vent plate 32. When exceeding a predetermined temperature, the positive temperature coefficient element 38 has electrical resistance that increases to infinity and thus blocks flow of a charge or discharge current.

The vent plate 32 is disposed under the cap plate 31, and performs a function of blocking an electrical connection of the electrode assembly 10 and the cap plate 31 in a predetermined pressure condition. Further, the vent plate 32 is fractured at a predetermined pressure condition to discharge a gas from the inside of the rechargeable battery 101.

For this reason, the vent plate 32 has a connection protrusion 32a that is protruded downward toward the sub-plate 34 and a notch 32b that is formed at a periphery of the connection protrusion 32a. The sub plate 34 is formed in a circular plate shape, faces the vent plate 32, and is electrically connected to the connection protrusion 32a. The sub plate 34 is bonded to the middle plate 33 by welding to be electrically connected to the electrode assembly 10 via the middle plate 33. However, the middle plate 33 is electrically connected to the vent plate 32 only through the sub-plate 34, and the sub-plate 34 does not directly contact the vent plate 32.

The middle plate 33 is disposed between the vent plate 32 and the sub-plate 34. A penetration hole to insert the connection protrusion 32a is formed at the center of the middle plate 33. For electrical connection to the positive electrode current collecting plate 41, a lead member 45 is fixed to the middle plate 33 by welding. The lead member 45 is bonded to each of the positive electrode current collecting plate 41 and the middle plate 33 by welding to electrically connect the positive electrode current collecting plate 41 and the middle plate 33.

Accordingly, the middle plate 33 is electrically connected to the vent plate 32 through the sub-plate 34 and the connection protrusion 32a at one side, and is connected to the positive electrode current collecting plate 41 through the lead member 45 at another side. Finally, the positive electrode current collecting plate 41 is electrically connected to the cap plate 31 through the lead member 45, the middle plate 33, the sub-plate 34, and the vent plate 32.

When an internal pressure of the rechargeable battery 101 increases, while the connection protrusion 32a moves upward, the connection protrusion 32a and the sub-plate 34 are separated and thus the electrode assembly 10 and the cap plate 31 are electrically separated. Further, after the connection protrusion 32a moves upward, when internal pressure of the rechargeable battery 101 further increases, the notch 32b is fractured, so a gas that is generated at the inside of the rechargeable battery 101 is discharged to the outside through the air outlet 31b.

Figure 2:
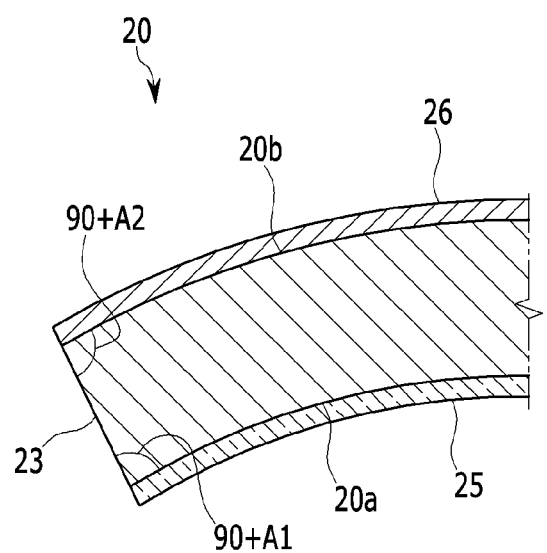
FIG. 2 is a partial cross-sectional view illustrating an upper portion of a case according to a first exemplary embodiment of the present invention.

FIG. 2 is a partial cross-sectional view illustrating an upper portion of a case according to a first exemplary embodiment of the present invention.

Referring to FIG. 2, a cut front end surface 23 is formed at the front end of the case 20, and the front end surface 23 meets at an inner surface 20a of the case 20 and an outer surface 20b of the case 20. An angle between the front end surface 23 and the outer surface 20b of the case 20 and an angle between the front end surface 23 and the inner surface 20a of the case 20 may be an obtuse angle. An angle between the front end surface 23 and the outer surface 20b of the case 20 is formed larger than that between the front end surface 23 and the inner surface 20a of the case 20. Further, when an angle between the front end surface 23 and the inner surface 20a of the case 20 is 90+A1 and an angle between the front end surface 23 and the outer surface 20b of the case 20 is 90+A2, A2 may be 1.1 times to 2.5 times A1.

Further, when the case 20 is formed with a plated steel plate, at the inner surface 20a and the outer surface 20b of the case 20, nickel plating layers 25, 26 are formed. The nickel plating layer 25 that is formed at the inner surface 20a is formed to a corner at which the front end surface 23 and the inner surface 20a meet, and a nickel plating layer 26 that is formed at the outer surface 20b is formed to a corner at which the front end surface 23 and the outer surface 20b meet.

A plating layer at a sharpened corner of a metal plate is easily peeled off from the metal plate, but in the present embodiment, when both corner angles of a front end surface 23 are formed as obtuse angles, rust occurrence can be reduced due to the plating layers 25, 26 remaining on the corners. Also, rust more easily occurs on a corner of an outer surface 20b, but when A2 is 1.1 times to 2.5 times A1, then a nickel plating layer 26 further remains on the corner of the outer surface 20b, such that rust occurrence can be efficiently reduced.

After a drawing process according to the first exemplary embodiment is performed, the upper end of the case 20 is cut by a blade pressing at the inside and at the outside, and thus a tilt angle where the front end surface 23 of the case 20 and the inner surface 20a and the outer surface 20b meet is formed as an obtuse angle. And thus when the case 20 is sharply cut by the blade, the nickel plating layers 25 and 26 are not separated but are formed to the corner of the front end surface 23.

As described above, according to the first exemplary embodiment, an angle between the front end surface and the outer surface is formed larger than an angle between the front end surface and the inner surface and thus a plating layer may be formed to the corner of the front end surface, thereby reducing rust occurrence.

Figure 3:
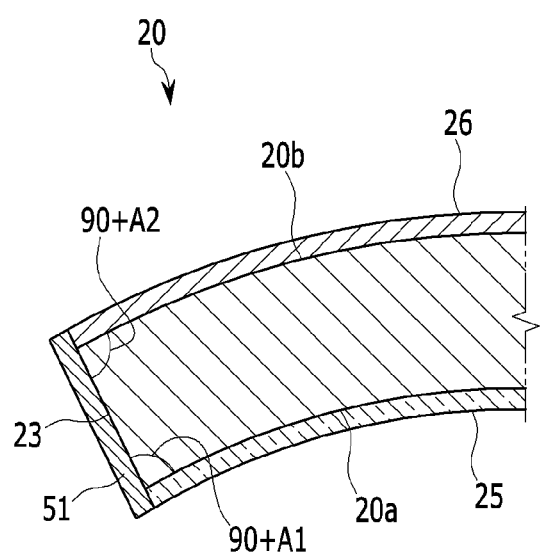
FIG. 3 is a partial cross-sectional view illustrating an upper portion of a case according to a second exemplary embodiment of the present invention.

FIG. 3 is a partial cross-sectional view illustrating an upper portion of a case according to a second exemplary embodiment of the present invention.

A case of a rechargeable battery according to the second exemplary embodiment is formed in the same structure as that of the rechargeable battery according to the first exemplary embodiment except that a film is formed at a front end surface, and thus a description of the same structure will be omitted.

A cut front end surface 23 is formed at the front end of the case of the rechargeable battery according to the second exemplary embodiment, and an inner surface 20a of a case 20 and an outer surface 20b of the case 20 meet at the front end surface 23.

At the inner surface 20a and the outer surface 20b of the case 20, a nickel plating layer 25 is formed. The nickel plating layer 25 that is formed at the inner surface 20a is formed to a corner where the front end surface 23 and the inner surface 20a meet, and a nickel plating layer 26 that is formed at the outer surface 20b is formed to a corner where the front end surface 23 and the outer surface 20b meet.

A film 51 for preventing rust from occurring is formed at the front end surface 23 of the case 20, the film 51 may be an oil film, and the film 51 may be a chromate film. Further, the film 51 may be an oxide film.

After an upper end portion of the case 20 is cut, the film 51 is formed, and when the film 51 is formed at the front end surface 23 of the case 20, rust occurrence in the case 20 can be efficiently reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
   an electrode assembly comprising a positive electrode and a negative electrode;
   a case that houses the electrode assembly; and
   a cap plate that is coupled to the case,
   wherein an angle between a front end surface that is formed at a front end of the case and an outer surface of the case is larger than an angle between the front end surface and an inner surface of the case, and
   wherein an oil film is formed over and extends beyond the front end surface of the case, and
   wherein the oil film is formed on a single plane including at least the front end surface of the case.

2. The rechargeable battery of claim 1, wherein the angle between the front end surface and the outer surface of the case is 90 degrees plus a second amount and the angle between the front end surface and the inner surface is 90 degrees plus a first amount.

3. The rechargeable battery of claim 2, wherein the second amount is 1.1 times to 2.5 times that of the first amount.

4. The rechargeable battery of claim 1, wherein a first plating layer is formed at the outer surface, and the first plating layer is formed to a corner at which the front end surface and the outer surface meet.

5. The rechargeable battery of claim 4, wherein a second plating layer is formed at the inner surface, and the second plating layer is formed to a corner at which the front end surface and the inner surface meet.

6. The rechargeable battery of claim 5, wherein the first plating layer that is formed at the outer surface of the case and the second plating layer that is formed at the inner surface of the case are made of nickel.

7. The rechargeable battery of claim 1, wherein the oil film is configured so as to prevent rust from occurring.

8. The rechargeable battery of claim 4, wherein the oil film extends over a front end surface of the first plating layer.

9. The rechargeable battery of claim 1,
   wherein the case has a first open end, where the cap plate is positioned within the first open end, wherein the first open end of the case is bent so as to extend inwardly such that the first open end engages with the cap plate to retain the cap plate in the opening.

10. The rechargeable battery of claim 5, wherein the single plane comprises the front end surface of the case and extends to ends of the first plating layer and the second plating layer, the ends of the first plating layer and the second plating layer substantially parallel to the front end surface of the case.

11. The rechargeable battery of claim 5, wherein the oil film is in direct physical contact with the front end surface of the case, an end of the first plating layer and an end of the second plating layer.

12. The rechargeable battery of claim 11, wherein the oil film has a length substantially the same as a combined length of the front end surface of the case, the end of the first plating layer and the end of the second plating layer.

13. The rechargeable battery of claim 11, wherein the oil film is substantially aligned with the front end surface of the case, the end of the first plating layer and the end of the second plating layer.

14. The rechargeable battery of claim 1, wherein the oil film is substantially linear.

15. The rechargeable battery of claim 1, wherein a majority portion of the oil film is formed on the front end surface of the case.

* * * * *